United States Patent
Ramakrishnaiah et al.

(10) Patent No.: US 11,163,832 B2
(45) Date of Patent: Nov. 2, 2021

(54) METHOD AND SYSTEM FOR CREATING ONE OR MORE TARGET ENTITY PROFILES

(71) Applicant: Infosys Limited, Bangalore (IN)

(72) Inventors: Shashidhar Bommavara Ramakrishnaiah, Bangalore (IN); Ivneet Kaur, Ghaziabad (IN); Debasis Panda, Bengaluru (IN); Aruna Patkuri, Bangalore (IN); Deepak Sharma, Bangalore (IN); Pinaki Sekhar Mishra, Bangalore (IN); Shine Babu Dhas, Marthandam (IN); Bivas Pathak, Electronic (IN)

(73) Assignee: INFOSYS LIMITED, Bangalore (IN)

(*) Notice: Subject to any disclaimer, the term of this patent is extended or adjusted under 35 U.S.C. 154(b) by 289 days.

(21) Appl. No.: 15/915,708

(22) Filed: Mar. 8, 2018

(65) Prior Publication Data

US 2019/0179969 A1    Jun. 13, 2019

(30) Foreign Application Priority Data

Dec. 8, 2017 (IN) .............................. 201741044065

(51) Int. Cl.
*G06F 16/903* (2019.01)
*G06F 16/9032* (2019.01)
*G06Q 30/02* (2012.01)

(52) U.S. Cl.
CPC .... *G06F 16/9032* (2019.01); *G06F 16/90335* (2019.01); *G06Q 30/02* (2013.01)

(58) Field of Classification Search
CPC ........... G06F 16/9032; G06F 16/90335; G06F 16/337; G06Q 30/02; G06Q 30/0201
USPC ......................... 707/603, 756, 758, 769, 803
See application file for complete search history.

(56) References Cited

U.S. PATENT DOCUMENTS

| | | | |
|---|---|---|---|
| 7,343,294 B1* | 3/2008 | Sandholm | G06Q 10/0637 705/7.29 |
| 8,793,701 B2 | 7/2014 | Engrand et al. | |
| 2011/0023022 A1* | 1/2011 | Harper | G06F 8/36 717/170 |
| 2011/0055196 A1* | 3/2011 | Sundelin | G06F 16/24575 707/711 |
| 2012/0215766 A1* | 8/2012 | Gorelik | G06F 16/248 707/722 |
| 2016/0055499 A1* | 2/2016 | Hawkins | G06Q 30/0271 705/7.33 |
| 2016/0260107 A1* | 9/2016 | Seth | G06Q 30/0201 |

* cited by examiner

*Primary Examiner* — Hares Jami
(74) *Attorney, Agent, or Firm* — Troutman Pepper Hamilton Sanders LLP (Rochester)

(57) ABSTRACT

The present technique discloses a method and system for creating target entity profile. Data related to target entity are collected from various sources. User configures, through genome management console of genome query engine, gene block—dimension matrix which defines relationship between gene blocks and dimensions present in the collected data. Based on gene block—dimension matrix, gene blocks are loaded. User further configures genome attributes of their choice for which data needs to be analyzed. Data corresponding to configured genome attributes are extracted from gene blocks and from these extracted data, genome attributes are calculated based on computation type.

18 Claims, 7 Drawing Sheets

METHOD AND SYSTEM FOR CREATING ONE OR MORE TARGET ENTITY PROFILES

This application claims the benefit of Indian Patent Application Serial No. 201741044065, filed Dec. 8, 2017, which is hereby incorporated by reference in its entirety.

FIELD

This invention relates generally to data analytics, and in particular, to a method and system for creating one or more target entity profiles.

BACKGROUND

Modern era is age of information. There are plenty of technologies to store various forms of structured and unstructured data. It will not be an exaggeration to say that there are countless data availability and capability to store it as well. For example, in case of data related to a customer, there are countless facets in which information can be added for that customer i.e. Demography, Transactions, Behavioral, Social Interactions, CRM interactions, Peer Groups, Voice Messages and so on. These can be considered as subject Areas. With the advent of Omni channels and devices and an explosion in customer data redrawing the landscape; complexity in understanding the customer has increased exponentially. Thus, it is important to harness big data to construct a unified entity view generated across the customer journey (Gene Blocks) and obtain useful insights about what customers need (Genome).

As per present technologies, the data processing from Gene Blocks to Genome was done manually by writing scripts. The creation, review and maintenance of the query were cumbersome. For any change of Genome attribute (Create, delete and update), a new code is required to be written. This is a manual process and involvement of the developer made it even more difficult. Again it takes much more effort to create and review the Genome query.

SUMMARY

The present invention overcomes the above mentioned drawbacks by creating a boundary less data platform which collates enterprise, digital, partner, and external data to enable creation of networked data products in the data intelligence grid. According to the present embodiment, a method for creating one or more target entity profiles is disclosed. The method includes ingesting data related to the one or more target entity from a plurality of data sources. Then, a gene block-dimension matrix is received, wherein the gene block-dimension matrix defines relationship between one or more dimensions present in the ingested data and one or more gene blocks. After that, the one or more gene blocks are loaded based on the gene block-dimension matrix. Further, one or more genome attributes are configured by a user, wherein the configuring step includes dynamically modifying pre-configured genome attributes by the user. Then, data corresponding to the one or more genome attributes are extracted from the one or more gene blocks. Finally, the target entity profiles are created by calculating the one or more genome attributes from the extracted data based on a computation type.

In an additional embodiment, a system for creating one or more target entity profiles is disclosed. The system includes a memory coupled to one or more processors which are configured to execute programmed instructions stored in the memory including ingesting data related to the one or more target entity from a plurality of data sources, receiving a gene block-dimension matrix, loading the one or more gene blocks based on the gene block-dimension matrix, configuring one or more genome attributes by a user, extracting data corresponding to the one or more genome attributes from the one or more gene blocks and creating the target entity profile by calculating the one or more genome attributes from the extracted data based on a computation type.

In another embodiment of the present disclosure, a non-transitory computer readable storage medium for creating one or more target entity profiles is disclosed. The computer readable storage medium which is not a signal stores computer executable instructions for creating the target entity profile by ingesting data related to the one or more target entity from a plurality of data sources, receiving a gene block-dimension matrix, loading the one or more gene blocks based on the gene block-dimension matrix, configuring one or more genome attributes by a user, extracting data corresponding to the one or more genome attributes from the one or more gene blocks and creating the target entity profile by calculating the one or more genome attributes from the extracted data based on a computation type.

BRIEF DESCRIPTION OF THE DRAWINGS

Various embodiments of the invention will, hereinafter, be described in conjunction with the appended drawings. There is no intention to limit the scope of the invention to such blocks or objects, or to any particular technology. These simplified diagrams are presented by way of illustration to aid in the understanding of the logical functionality of one or more aspects of the instant disclosure and is not presented by way of limitation.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Exemplary embodiments of the present invention provide a method and system for creating target entity profile. Data related to target entity are collected from various sources. User configures, through genome management console of genome query engine, gene block—dimension matrix which defines relationship between gene blocks and dimensions present in the collected data. Based on gene block—dimension matrix, gene blocks are loaded. User further configures genome attributes of their choice for which data needs to be analyzed. Data corresponding to configured genome attributes are extracted from gene blocks and from these extracted data, genome attributes are calculated based on computation type.

Figure 1:
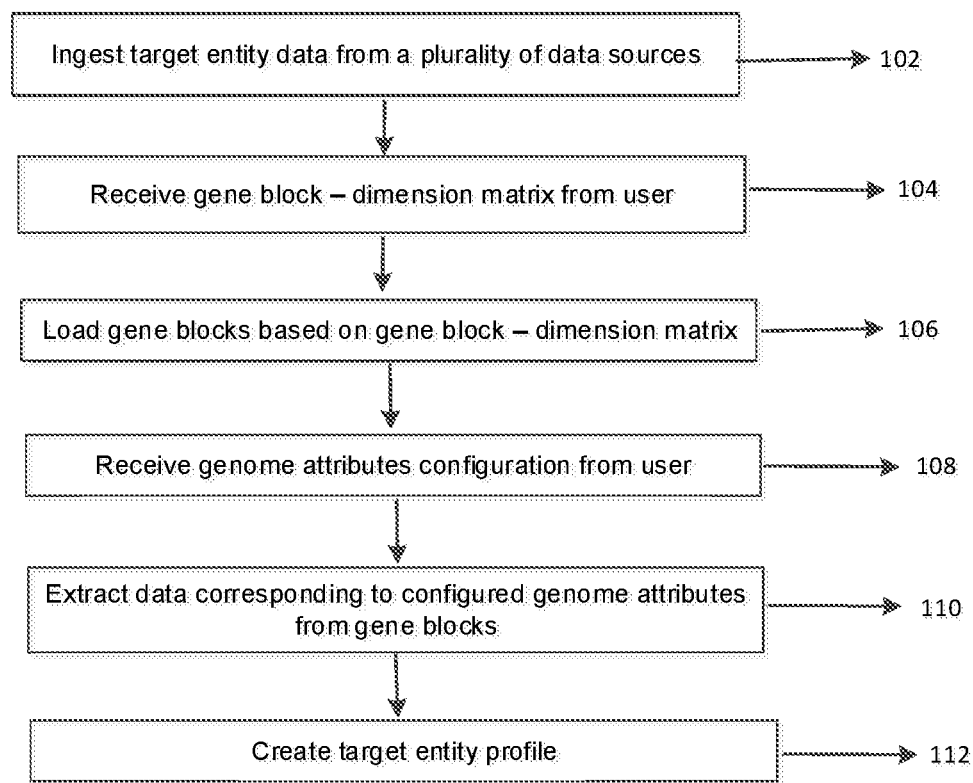
FIG. 1 is a flowchart, illustrating a method for creating one or more target entity profiles, in accordance with an embodiment of the present invention.
Figure 2:
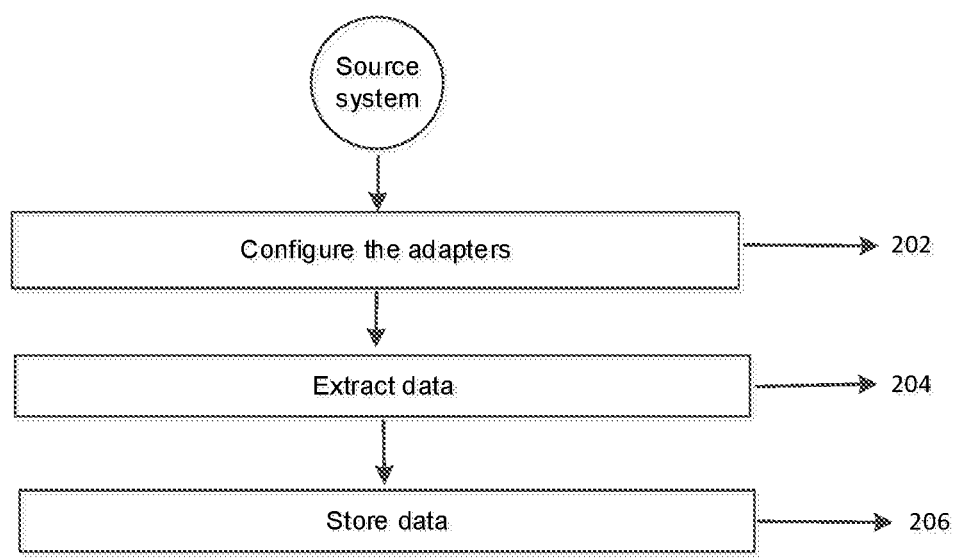
FIG. 2 is a flowchart, illustrating a method for data ingestion, in accordance with an embodiment of the present invention.

FIG. 1 is a flowchart, illustrating a method for creating one or more target entity profiles, in accordance with an embodiment of the present invention. The target entity data from a plurality of sources are ingested at step 102. FIG. 2 describes the data ingestion process. Data from heterogeneous source systems are ingested to landing zone. Landing zone acquires data from source systems leveraging data ingestion components and is stored in HDFS or SQL or No-SQL database. Data in this zone can be refreshed with every batch. Sources can be internal (e.g. Operational Data Stores, Product Data Bases) or external (e.g. various social media data). Adapters are configured to get target entity data from various sources at step 202. Data related to target entity is extracted from various sources at step 204. These data are stored in data lake at step 206. It is called a Raw zone as data from source is kept as is in this space. Data ingestion into the raw zone uses a push and pull mechanism from both internal and external sources. Some of the source systems push the data into raw zone by using FTP/SFTP/Source system tool based connectors. In the data lake environment different connectors are created to extract the data from both internal (relational database, file systems etc.) and external sources. These connectors process both real-time (based on events) and batch structured (relational, tabular etc.) and unstructured data (json, xml etc.) data into raw zone. Once ingested, raw zone data is used for further processing.

Figure 3:
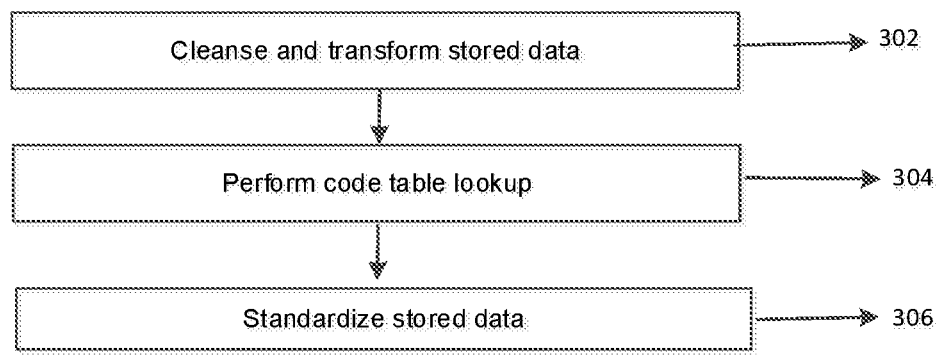
FIG. 3 is a flowchart, illustrating a method for data processing, in accordance with an embodiment of the present invention.

FIG. 3 describes data processing stage. On the Raw zone data as mentioned at step 206 of FIG. 2 cleansing and transformation rules are applied at step 302. Examples of these rules are "Remove special characters", "Null Check", "Date Validations", "String to Date conversion". These examples are given only for understanding purpose and not to limit scope of this disclosure. Code table lookup is performed on cleansed data at step 304. By performing this look up, cleansed data is enriched with additional details if there are some short codes in the record. For example, if Status is "0" code look up should be done and Status should be entered as "Accepted" or if status is "1", it should be put as "Rejected". Next, the stored data is standardized at step 306 to remove any ambiguous data element. This is the process by which similar data received in various source systems coming in different formats is transformed to a common format. After that, data from different sources are merged using some parameters. For example, customer comment from a social media can be merged with golden customer record with parameters such as "First Name+Last Name+Phone No+Email Id". All these transformed data are stored in the data lake in a zone called as Conformed zone. This is considered as the final clean data on which Gene blocks would be built.

Figure 4:
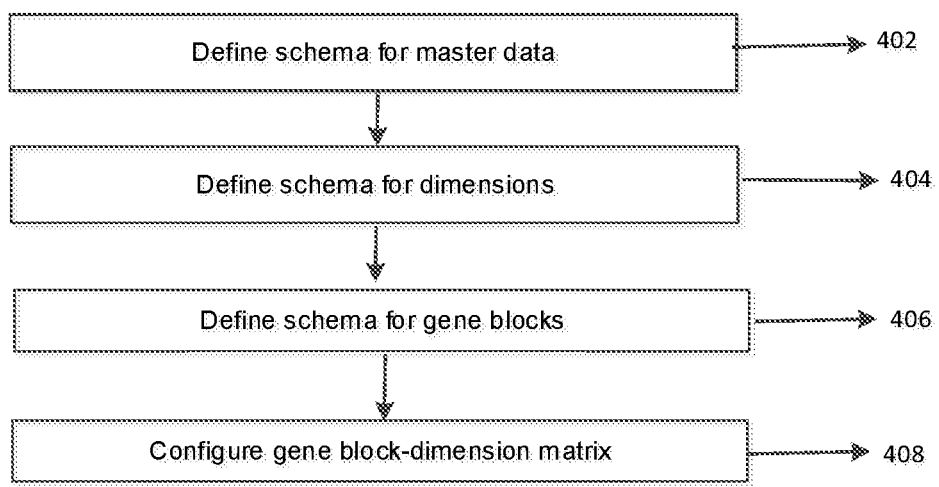
FIG. 4 is a flowchart, illustrating a method for configuring data, in accordance with an embodiment of the present invention.

FIG. 4 is a flowchart, illustrating a method for configuring data. Schema for master data is defined at step 402. For example, Currency as a master data is saved with Currency Code, Currency Description, Conversion Rates as mentioned in table 1.

TABLE 1

| Currency Code | Currency Description | Conversion to base Currency |
| --- | --- | --- |
| USD | US Dollar | 1 |
| INR | Indian Rupees | 0.02 |
| GBP | Pound | 1.25 |

Schema for dimensions are defined at step 404. For example, age group is a customer dimension that is stored like the below representation.

TABLE 2

| Age Group | Description | Age Group Category |
| --- | --- | --- |
| <30 | Less than 30 | Young |
| >30 < 45 | 30 to 45 | Mid |
| >45 | Greater than 45 | Matured |

Schema for gene blocks are defined at step 406. Gene blocks are multi-dimensional, flattened, de-normalized transaction tables for each subject area. These Gene blocks contain data in the lowest granular form and the dimensions that provide the uniqueness of each record in the gene blocks are flattened. This flattening structure helps the users to access all the information from one gene block without having lots of joins. For example, Transaction Gene Block flattened with "Age Group Category" looks like Table 3

TABLE 3

| Attribute Name | Datatype | Length |
| --- | --- | --- |
| customer_id | varchar | 50 |
| first_name | varchar | 20 |
| middle_name | varchar | 20 |
| last_name | varchar | 20 |
| preffered_name | varchar | 20 |
| Gender | varchar | 20 |
| Income | varchar | 20 |
| Region | varchar | 20 |
| birth_date | date | |
| organizaton_name | varchar | 20 |
| organization_type | varchar | 20 |
| job_title | varchar | 20 |
| Influence | varchar | 20 |
| pref_comm_channel | varchar | 20 |
| Profession | varchar | 20 |
| Language | varchar | 20 |
| res_address_line_1 | varchar | 20 |
| residence_address_line_2 | varchar | 40 |
| residence_city | varchar | 20 |
| residence_country | varchar | 20 |

Gene block—dimension matrix is configured at step 408. Example of gene block—dimension matrix is given below at table 4.

TABLE 4

| Dimensions | Values | Customer | Accounts | Transactions | Positions |
|---|---|---|---|---|---|
| DATE | Monthly/Quarterly/Yearly | Y | Y | Y | Y |
| AGE GROUP | Less than 30, 30-50, 50 Above | Y | | | |
| CUSTOMER TYPE | Description indicating retail/institutional investor | Y | | | Y |
| PROFESSION TYPE | Employed, Business, Sole Proprietor | Y | | | |
| CUSTOMER POTENTIAL | Group of $ investment Value 0 to 10000, 10000 to 100000, 100000 above | Y | Y | | |
| RISK TOLERANCE | Customer risk tolerance - Conservative, Aggressive, Moderate | Y | | | |
| FIRM INDUSTRY | IT, Manufacturing, Retail | Y | | | |
| ACCOUNT SUBCODE | Individual Active Assets Account, Individual Basic Securities Account, Individual Retirement Account etc. | | Y | | |
| TRANSACTION TYPE | Wire in, Wire out, Buy, Sell, Dividend payment, Interest payment, Fees, Fines, Debit Other, Cash, Deposit, Cash Withdraw | | | Y | |

Figure 5:
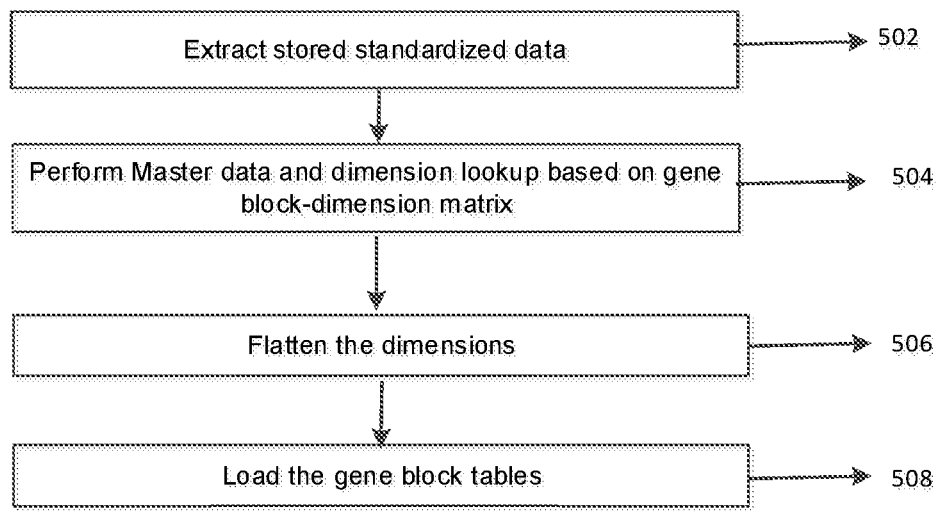
FIG. 5 is a flowchart, illustrating a method for processing data to create gene block, in accordance with an embodiment of the present invention.

This gene block-dimension matrix, configured by user, is received at step 104. After that, the gene block table is loaded at step 106 based on gene block-dimension matrix. FIG. 5 is a flowchart, illustrating a method for processing data to create gene block. Stored standardized data are extracted from confirmed zone at step 502. Then master data and dimension look up is performed at step 504 based on gene block—dimension matrix. After the lookup, the necessary columns required for gene blocks are extracted from dimensions—master data. This flattens the dimension structure in the gene block as mentioned in step 506. After the dimensions are flattened, the target gene blocks are loaded at step 508.

Referring back to FIG. 1, user configured genome attributes are received at step 108. Genomes are high performance/low latency tables containing set of standards and derived attributes. These pre-fabricated, derived attributes are based on Recency, Frequency, Monetary and Quantity of almost all the measures of the subject area. These attributes will help the data analyst to get the insights quickly. Genomes are basically built in the form of truncate and load tables. An exemplary genome table configuration is given below at table 5. This table is provided just for understanding purpose without limiting the scope of the invention.

ence Date, Reference Gene block date and Add Constraints. User can delete any of the above mentioned genome attributes or can edit attributes such as Duration, Reference Date or add constraints. Data corresponding to configured genome attributes are extracted from gene blocks at step 110 by parsing the Json file. The target entity profile is created by calculating the one or more genome attributes from the extracted data at step 112. Based on the different computation types (Recency, Frequency, Monetary and Quantity) and Computation Functions (Max, Min, Sum etc.) mentioned in the Json configuration file, Genome Query Engine performs the transformations and processes the data to calculate Genome attributes. Calculated Genome attributes are loaded to Genome Table by Genome Query Engine scripts. With the above processing steps both the Gene Blocks and Genome are now ready for further consumption in form of visualizations or analytics needs.

Figure 6:
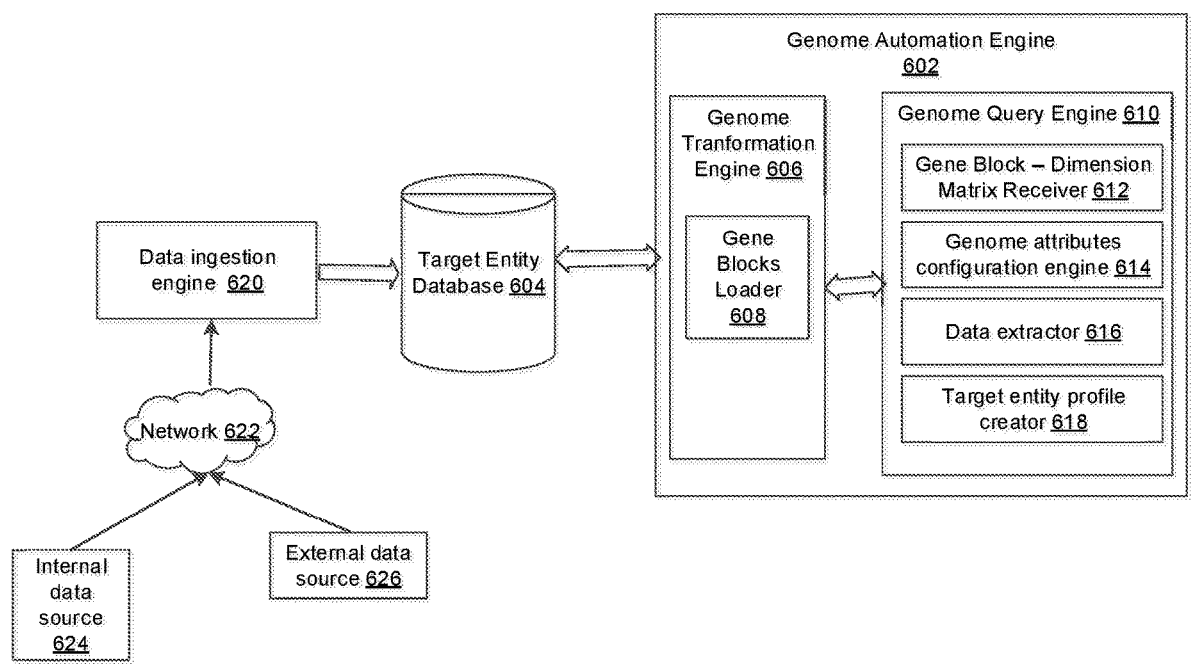
FIG. 6 is an architectural diagram of the system for creating one or more target entity profiles, in accordance with an embodiment of the present invention.

FIG. 6 is an architectural diagram of the system for creating one or more target entity profiles, in accordance with an embodiment of the present invention. This includes a Genome Automation Engine 602—and target entity database 604. The target entity database 604 stores all the data related to target entity ingested from a plurality of data sources. Data ingestion engine 620 connects with internal

TABLE 5

| Genome Attribute | Gene blocks | Computation type | Dimension table | Dimension columns | Dimension value | Reference date | Duration (days) |
|---|---|---|---|---|---|---|---|
| Max_sal_transaction | Sales | Recency | Product_category | Product_division | Footwear | 25-09-2017 | 90 |
| Total_purchased_fow_retrn_700 | Sales | Monetary | Product_category | Product_short_code | FOW | 20-07-2017 | 700 |
| Total_puchased_blue_catg_bef_retrn_700 | Sales | Quantity | Coclor_dim | Color_short_code | BLU | 20-07-2017 | 700 |

A Json file is generated from the genome configuration layer which is taken by genome query engine as an input and parse it for further processing. Any pre-configured genome attributes can be dynamically modified by user to obtain desired result. User can edit/delete certain genome attributes based on configuration done by data scientist. For example, the fields to create genome attributes may include gene block (The subject area on which attribute has to be created, like Customer gene block, Sales Gene block, Browsing gene block etc.), Computation Type (Recency, Frequency, Monetary, Quantity, Direct, Modal attributes), Table/Custom (The column on which select would be done), Dimensions (Dimensions for the selected gene block, like Product Category dimension, Color dimension etc.), Duration, Referand external sources (624, 626) through network 622 to collect data related to the target entity. Details regarding data ingestion process is described in step 102 of FIG. 1. The Genome Automation Engine includes genome transformation engine 606 and Genome Query Engine 610. Genome query engine 610 is an integral part of Genome Management Console and is used to maintain genome attributes. Genome query engine 610 contains Gene Block—Dimension Matrix Receiver 612, Genome attributes configuration engine 614, Data extractor 616 and Target entity profile creator 618. Genome transformation engine 606 includes Gene Blocks Loader 608. The Gene Block—Dimension Matrix Receiver 612 receives gene block—dimension matrix created by the user. Details about gene blocks, dimensions and gene block—dimension matrix is described in relation to step 104 of FIG. 1. Gene Blocks Loader 608 loads gene blocks based on the gene block—dimension matrix. The process of loading gene blocks is explained in FIG. 5 herein above. Genome attributes configuration engine 614 facilitates the user to configure genome attributes on which the data needs to be analyzed. This configuration includes modifying any pre-configured genome attributes. Details regarding genome attributes are explained with respect to step 108 of FIG. 1. The Data extractor 616 extracts data corresponding to the configured genome attributes from the gene blocks. The Target entity profile creator 618 creates target entity profiles by calculating configured genome attributes from extracted data. This calculation is done based on computation type (Recency, Frequency, monetary and quantity).

Figure 7:
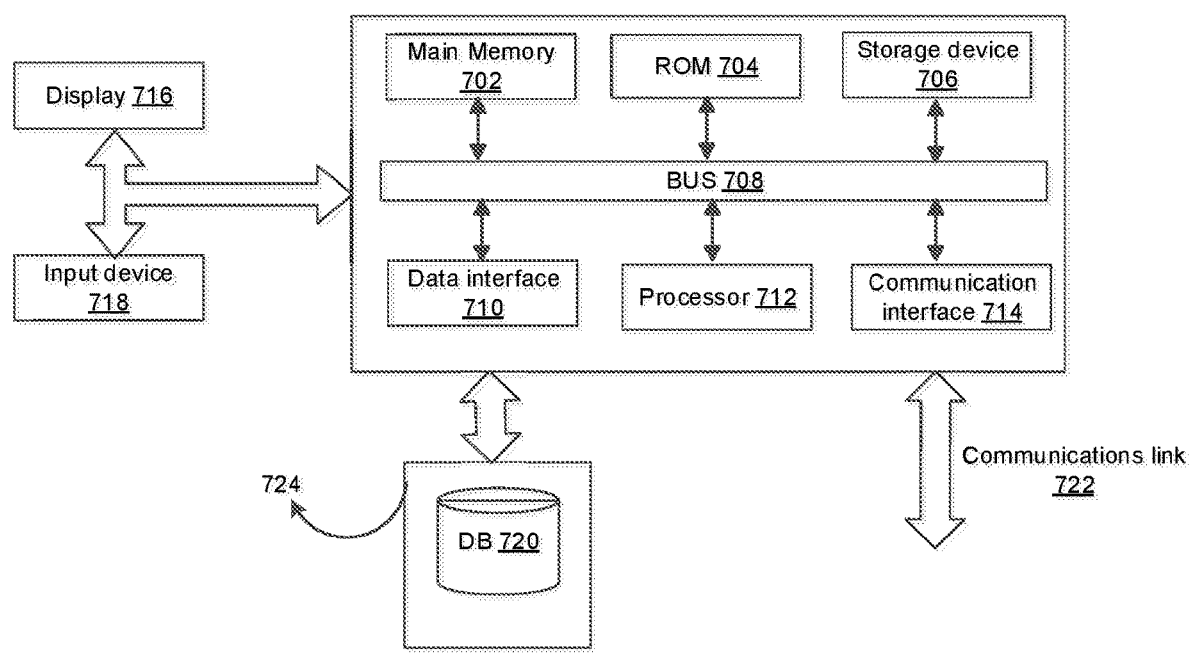
FIG. 7 is a diagram of a computer system with which the present invention can be implemented.

FIG. 7 is a diagram of a computer system with which the present invention can be implemented. In an embodiment of the invention, execution of the sequences of instructions required to practice the invention is performed by a single computer system. According to other embodiments of the invention, two or more computer systems coupled by a communication link 722 may perform the sequence of instructions required to practice the invention in coordination with one another. In order to avoid needlessly obscuring the invention, a description of only one computer system will be presented below; however, it should be understood that any number of computer systems may be employed to practice the invention. Each computer system may include a communication interface 714 coupled to the bus 708. The communication interface 714 provides two-way communication between computer systems. The communication interface 714 of a respective computer system transmits and receives electrical, electromagnetic or optical signals that include data streams representing various types of signal information, e.g., instructions, messages and data. A communication link 722 links one computer system with another computer system. For example, the communication link 722 may be a LAN, in which case the communication interface 714 may be a LAN card, or the communication link 722 may be a PSTN, in which case the communication interface 714 may be an integrated services digital network (ISDN) card or a modem.

A computer system may transmit and receive messages, data, and instructions, including program, i.e., application, code, through its respective communication link 722 and communication interface 714. Received program code may be executed by the respective processor(s) 712 as it is received, and/or stored in the storage device 706, or other associated non-volatile media, for later execution.

In an embodiment, the computer system operates in conjunction with a data storage system 706, e.g., a data storage system 724 that contains a database 720 that is readily accessible by the computer system. The computer system communicates with the data storage system 724 through a data interface 710. A data interface 710, which is coupled to the bus 708, transmits and receives electrical, electromagnetic or optical signals that include data streams representing various types of signal information, e.g., instructions, messages and data. In embodiments of the invention, the functions of the data interface 710 may be performed by the communication interface 714.

Computer system includes a bus 708 or other communication mechanism for communicating instructions, messages and data, collectively, information, and one or more processors 712 coupled with the bus 708 for processing information. Computer system also includes a main memory 702, such as a random access memory (RAM) or other dynamic storage device, coupled to the bus 708 for storing dynamic data and instructions to be executed by the processor(s) 712. The main memory 702 also may be used for storing temporary data, i.e., variables, or other intermediate information during execution of instructions by the processor(s) 712.

The computer system may further include a read only memory (ROM) 704 or other static storage device coupled to the bus 508 for storing static data and instructions for the processor(s) 712. A storage device 706, such as a magnetic disk or optical disk, may also be provided and coupled to the bus 708 for storing data and instructions for the processor(s) 712.

A computer system may be coupled via the bus 708 to a display device 706, such as, but not limited to, a cathode ray tube (CRT), for displaying information to a user. An input device 718, e.g., alphanumeric and other keys, is coupled to the bus 708 for communicating information and command selections to the processor(s) 712.

According to one embodiment of the invention, an individual computer system performs specific operations by their respective processor(s) 712 executing one or more sequences of one or more instructions contained in the main memory 702. Such instructions may be read into the main memory 702 from another computer-usable medium, such as the ROM 704 or the storage device 706. Execution of the sequences of instructions contained in the main memory 702 causes the processor(s) 712 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 712. Such a medium may take many forms, including, but not limited to, non-volatile, volatile and transmission media. Non-volatile media, i.e., media that can retain information in the absence of power, includes the ROM 704, CD ROM, magnetic tape, and magnetic discs. Volatile media, i.e., media that cannot retain information in the absence of power, includes the main memory 702. Transmission media includes coaxial cables, copper wire and fiber optics, including the wires that comprise the bus 708. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

The above mentioned description is presented to enable a person of ordinary skill in the art to make and use the invention and is provided in the context of the requirement for obtaining a patent. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

What is claimed is:

1. A method comprising:
   ingesting, by a computing device, heterogeneous data related to the one or more target entities from a plurality of data sources;

processing, by the computing device, the heterogeneous data by applying one or more cleansing rules to the heterogeneous data, enriching the cleansed heterogeneous data based on codes in a code lookup table, and standardizing the enriched heterogeneous data based on one or more standardization rules to generate processed heterogeneous data;

receiving, by the computing device, a gene block-dimension matrix, wherein the gene block-dimension matrix is configured through one or more user inputs via a genome management user interface console and defines a relationship between one or more dimensions present in the ingested data and one or more gene blocks;

loading, by the computing device, the one or more gene blocks based on the gene block-dimension matrix;

receiving, by the computing device, one or more genome attributes configured based on input receive from a user, wherein the configuration includes dynamically modifying pre-configured genome attributes by adding one or more constraints;

extracting, by the computing device, data from the processed heterogeneous data corresponding to the one or more genome attributes from the one or more gene blocks; and creating, by the computing device, target entity profiles by calculating the one or more genome attributes from the extracted data based on a computation type.

2. The method of claim 1 further comprising defining, by the computing device, schema for master data, the one or more dimensions and the one or more gene blocks.

3. The method of claim 1, wherein the data in one or more gene blocks are flattened.

4. The method of claim 1 further comprising merging, by the computing device, the ingested data by using one or more common parameters.

5. The method of claim 1, wherein the computation type comprises recency, frequency, monetary or quantity.

6. The method of claim 1, wherein the genome query engine comprises genome configuration engine and genome data pipeline.

7. A system comprising:
one or more processors; and
one or more memories operatively coupled to at least one of the one or more processors and having instructions stored thereon that, when executed by at least one of the one or more processors, cause the at least one of the one or more processors to:
ingest heterogeneous data related to the one or more target entities from a plurality of data sources;
process the heterogeneous data by applying one or more cleansing rules to the heterogeneous data, enriching the cleansed heterogeneous data based on codes in a code lookup table, and standardizing the enriched heterogeneous data based on one or more standardization rules to generate processed heterogeneous data;
receive a gene block-dimension matrix, wherein the gene block-dimension matrix is configured through one or more user inputs via a genome management user interface console and defines a relationship between one or more dimensions present in the ingested data and one or more gene blocks;
loading the one or more gene blocks based on the gene block-dimension matrix;
receive one or more genome attributes configured based on input receive from a user, wherein the configuring step includes dynamically modifying pre-configured genome attributes by adding one or more constraints;
extract data from the processed heterogeneous data corresponding to the one or more genome attributes from the one or more gene blocks; and
create the target entity profiles by calculating the one or more genome attributes from the extracted data based on a computation type.

8. The system of claim 7, wherein at least one of the one or more memories has further instructions stored thereon that, when executed by at least one of the one or more processors, cause at least one of the one or more processors to define schema for master data, the one or more dimensions and the one or more gene blocks.

9. The system of claim 7, wherein the data in one or more gene blocks are flattened.

10. The system of claim 7, wherein at least one of the one or more memories has further instructions stored thereon that, when executed by at least one of the one or more processors, cause at least one of the one or more processors to merge the ingested data by using one or more common parameters.

11. The system of claim 7, wherein the computation type comprises recency, frequency, monetary or quantity.

12. The system of claim 7, wherein the genome query engine comprises genome configuration engine and genome data pipeline.

13. A non-transitory computer readable medium having stored thereon instructions the non-transitory computer readable medium comprising machine executable code which when executed by at least one processor, causes the at least one processor to perform steps comprising:
ingesting heterogeneous data related to the one or more target entities from a plurality of data sources;
processing the heterogeneous data by applying one or more cleansing rules to the heterogeneous data, enriching the cleansed heterogeneous data based on codes in a code lookup table, and standardizing the enriched heterogeneous data based on one or more standardization rules to generate processed heterogeneous data;
receiving a gene block-dimension matrix, wherein the gene block-dimension matrix is configured through one or more user inputs via a genome management user interface console and defines a relationship between one or more dimensions present in the ingested data and one or more gene blocks;
loading the one or more gene blocks based on the gene block-dimension matrix;
receiving one or more genome attributes configured based on input receive from a user, wherein the configuring step includes dynamically modifying pre-configured genome attributes by adding one or more constraints;
extracting data from the processed heterogeneous data corresponding to the one or more genome attributes from the one or more gene blocks; and
creating the target entity profile by calculating the one or more genome attributes from the extracted data based on a computation type.

14. The non-transitory computer readable medium of claim 13, wherein the at least one processor further perform the step of defining schema for master data, the one or more dimensions and the one or more gene blocks.

15. The non-transitory computer readable medium of claim 13, wherein the data in one or more gene blocks are flattened.

16. The non-transitory computer readable medium of claim 13, wherein the at least one processor further perform the step of merging the ingested data by using one or more common parameters.

17. The non-transitory computer readable medium of claim 13, wherein the computation type comprises recency, frequency, monetary or quantity.

18. The non-transitory computer readable medium of claim 13, wherein the genome query engine comprises genome configuration engine and genome data pipeline.

* * * * *